US011934517B2

(12) United States Patent
Lotspeich (10) Patent No.: US 11,934,517 B2
(45) Date of Patent: Mar. 19, 2024

(54) SYSTEMS AND METHODS FOR RELIABLY INJECTING CONTROL FLOW INTEGRITY INTO BINARIES WITHOUT SOURCE CODE

(71) Applicant: RUNSAFE SECURITY, INC., McLean, VA (US)

(72) Inventor: Erik Raymond Lotspeich, Huntsville, AL (US)

(73) Assignee: RunSafe Security, Inc., McLean, VA (US)

( * ) Notice: Subject to any disclaimer, the term of this patent is extended or adjusted under 35 U.S.C. 154(b) by 342 days.

(21) Appl. No.: 17/268,585

(22) PCT Filed: Aug. 15, 2019

(86) PCT No.: PCT/US2019/046626
§ 371 (c)(1),
(2) Date: Feb. 15, 2021

(87) PCT Pub. No.: WO2020/037108
PCT Pub. Date: Feb. 20, 2020

(65) Prior Publication Data
US 2021/0173921 A1 Jun. 10, 2021

Related U.S. Application Data

(60) Provisional application No. 62/764,705, filed on Aug. 15, 2018.

(51) Int. Cl.
*G06F 21/00* (2013.01)
*G06F 21/54* (2013.01)
*G06F 21/57* (2013.01)

(52) U.S. Cl.
CPC ............ *G06F 21/54* (2013.01); *G06F 21/577* (2013.01); *G06F 2221/033* (2013.01)

(58) Field of Classification Search
USPC .......................................................... 726/25
See application file for complete search history.

(56) References Cited

U.S. PATENT DOCUMENTS 6,412,071 B1 6/2002 Hollander
7,437,759 B1 10/2008 Szor
(Continued)

OTHER PUBLICATIONS

Ying, Lingyun et al. ReconBin: Reconstructing Binary File from Execution for Software Analysis. 2009 Third IEEE International Conference on Secure Software Integration and Reliability Improvement. https://ieeexplore.ieee.org/stamp/stamp.jsp?tp=&arnumber=5325374 (Year: 2009).*

(Continued)

*Primary Examiner* — Jeremiah L Avery
(74) *Attorney, Agent, or Firm* — Perkins Coie LLP (57) ABSTRACT

Systems and methods of defending against stack-based cybersecurity attacks that exploit vulnerabilities in buffer overflows. The embodiments disclosed herein propose hijacking program flow in a program binary by insert call checking CFI code before calling a target. Examples of a target can be a function within the program binary, a register, or a memory location. If the call target is a valid call target (e.g., included in a global list of addresses), normal program flow resumes and the program flow is transferred to the target. On the contrary, if the call target is not a valid call target (e.g., not included in a global list of addresses), the program binary is deliberately crashed.

20 Claims, 7 Drawing Sheets

(56) References Cited

U.S. PATENT DOCUMENTS

| | | | | |
|---|---|---|---|---|
| 8,104,021 | B2* | 1/2012 | Erlingsson | G06F 12/1441 717/126 |
| 8,407,675 | B1* | 3/2013 | Clark | G06F 8/52 717/137 |
| 9,495,237 | B1* | 11/2016 | Gschwind | G06F 11/0763 |
| 10,412,116 | B1* | 9/2019 | Powers | G06F 9/44505 |
| 10,554,685 | B1* | 2/2020 | McArdle | H04L 63/0272 |
| 11,822,654 | B2* | 11/2023 | Goldstein | G06F 21/52 |
| 2008/0052468 | A1* | 2/2008 | Speirs | G06F 13/4059 711/132 |
| 2014/0181981 | A1* | 6/2014 | Christodorescu | G06F 21/54 726/25 |
| 2016/0357958 | A1* | 12/2016 | Guidry | G06F 21/53 |
| 2017/0192833 | A1* | 7/2017 | Gschwind | G06F 21/52 |
| 2018/0143781 | A1* | 5/2018 | Greathouse | G06F 9/451 |
| 2018/0268130 | A1* | 9/2018 | Ghosh | G06F 21/53 |
| 2019/0042760 | A1* | 2/2019 | Gutson | G06F 21/54 |
| 2019/0243964 | A1* | 8/2019 | Shukla | G06F 21/54 |
| 2023/0018585 | A1* | 1/2023 | Liljestrand | G06F 3/0655 |

OTHER PUBLICATIONS

Heffley, Jon; Meunier, Pascal. Can source code auditing software identify common vulnerabilities and be used to evaluate software security?. Proceedings of the 37th Annual Hawaii International Conference on System Sciences, 2004. https://ieeexplore.ieee.org/stamp/stamp.jsp?tp=&arnumber=1265654 (Year: 2004).*

Davidson, Jack W. et al. A System for the Security Protection of Embedded Binary Programs. 2016 46th Annual IEEE/IFIP International Conference on Dependable Systems and Networks Workshop (DSN-W). https://ieeexplore.ieee.org/stamp/stamp.jsp?tp=&arnumber=7575384 (Year: 2016).*

Edwards, Joe; Lemieux, Guy G.F. Real-time object detection in software with custom vector instructions and algorithm changes. 2017 IEEE 28th International Conference on Application—specific Systems, Architectures and Processors (ASAP). https://ieeexplore.ieee.org/stamp/stamp.jsp?tp=&arnumber=7995262 (Year: 2017).*

* cited by examiner

| Without call checking CFI | With call checking CFI |
|---|---|
| call example_fn | push rdi            # Save since fn might be using<br>mov  rdi, example_fn # Address from our Model<br>call fnsearch       # Call our check<br>pop  rdi            # Restore<br>call example_fn |

*FIG. 7A*

| Without call checking CFI | With call checking CFI |
|---|---|
| call rax | push rdi            # Save since fn might be using<br>mov  rdi, rax       # Address from register<br>call fnsearch       # Call our check<br>pop  rdi            # Restore<br>call rax |

*FIG. 7B*

| Without call checking CFI | With call checking CFI |
|---|---|
| call [rodata_addr] | push rdi               # Save since fn might be using<br>mov  rdi, [rodata_addr] # Address rodata<br>call fnsearch          # Call our check<br>pop  rdi               # Restore<br>call [rodata_addr] |

*FIG. 7C*

SYSTEMS AND METHODS FOR RELIABLY INJECTING CONTROL FLOW INTEGRITY INTO BINARIES WITHOUT SOURCE CODE

CROSS-REFERENCE TO RELATED APPLICATIONS

This is a U.S. National Stage of PCT/US2019/046626 filed Aug. 15, 2019, which claims priority to U.S. Provisional Application No. 62/764,705 filed Aug. 15, 2018, both of which are incorporated herein by reference in their entireties.

TECHNICAL FIELD

This disclosure is related to improved cybersecurity solutions. More particularly, embodiments disclosed herein are directed at hijacking normal program flow in a program binary by injecting call checking code into the program binary which verifies if a call to a target (e.g., a function, a register, or a memory location) is valid.

BACKGROUND

The ubiquitous use of electronic devices has led to an increased concern for security. In an age where software controls a significant portion of our daily lives, this concern is valid now more than ever. While there have been several attempts at building better tools and developing better processes to avoid introducing bugs in software that lead to vulnerabilities, attackers are coming up with newer ways to exploit vulnerabilities in software. One of the most prominent attack methods are stack-based attacks, which is a type of a return-oriented programming (ROP) attack. Stack-based attacks exploit vulnerabilities in software to hijack control flow by deviating from the intended control flow of the program and often times executing arbitrary code directed by the attacker to perform malicious computation.

One of the methods used to protect against the hijacking of computer software is the use of the enforcement of Control Flow Integrity ("CFI"). CFI is a binary transformation method that protects indirect control transfers in the form of calls, returns and indirect jumps, and by tagging control transfers and valid destinations with identifier strings or otherwise identification labels. A control transfer can only jump to an address if the tag at the destination matches the tag at the control transfer. Each control transfer may have many potential targets, which will all have identical tags. Any transfers that target the same address also will have identical tags.

However, conventional CFI methods necessitate that the structure of the identification labels requires a rigorous implementation process that generally renders widespread or commercial application unfeasible. For example, a unique identifier is attached to each call-destination and return-destination pairing. Further, valid indirect call flow transfer targets from a call or return instruction are restricted to a single destination specifically paired to that origin. Consequently, conventional CFI systems are complicated and require significant overhead. Thus, there is an increased need for improved CFI systems and methods for mitigating stack-based attacks.

DETAILED DESCRIPTION

This disclosure is directed at systems and methods of defending against stack-based cybersecurity attacks that exploit vulnerabilities in buffer overflows. One way of handling buffer overflows can be to make changes to the source code. In many scenarios, making changes to the source code may not be feasible. For example, a programmer might not have the source code at all, or does not have permission to make fixes to the source code. The present technology is directed at such scenarios. That is, one advantage of the disclosed technology is that vulnerabilities arising due to buffer overflows can be handled even in scenarios where the source code is unavailable or making changes to the source code is not possible. Embodiments disclosed herein are directed at making transforms or changes to a program binary without modifying the source code. Examples of a binary can be firmware, a program for running a web server, document viewer, a web browser, a mobile application, or any other program binary. The transformation of an original program binary (e.g., provided by manufacturers and suppliers) associated with an electronic system into a transformed binary (e.g., in accordance with methods disclosed herein) can be done before or after the electronic system is deployed for usage and does not require access to source code or an operating system. Furthermore, a transformed binary does not negatively impact or otherwise alter or the typical behavior of the electronic system. If one or more changes to a program binary are made to a program binary, the resulting binary is called a transformed binary, and the changes are said to have been made at "transform time."

The system and methods of the present disclosure can be applied across many different operating systems (e.g., Linux, UNIX, Windows) and in devices with no traditional operating system. For purposes of the discussions herein, the term "system" generally refers to any computing system including but not limited to smartphones, routers, wearable consumer devices, tablets, web servers, email servers, laptops, desktops, switches, or generally any processor-controlled electronic device.

Conventional CFI enforcement is carried out through the use of a Control Flow Graph ("CFG"). The CFG dictates the software execution path. Conventionally, the CFG can be defined or otherwise generated by analysis, such as, source-code analysis, binary analysis, or execution profiling.

The embodiments of the improved (e.g., more reliable) CFI disclosed herein are directed to hijacking program flow in a binary by injecting call checking code (into the program binary) which verifies if a call to a target is valid or not. The injected call checking code improves the robustness of the program binary against cyberattacks and results in an improved CFI. Yet, the improved CFI consumes less average overhead and does not require all of the complications of the conventional CFI systems. Also, the improved CFI system and method does not require the generation of a CFG. The disclosed call checking CFI code can be implemented via static binary rewriting. Various embodiments, advantages, and aspects of the disclosed technology will be apparent in the following discussions.

Figure 1:
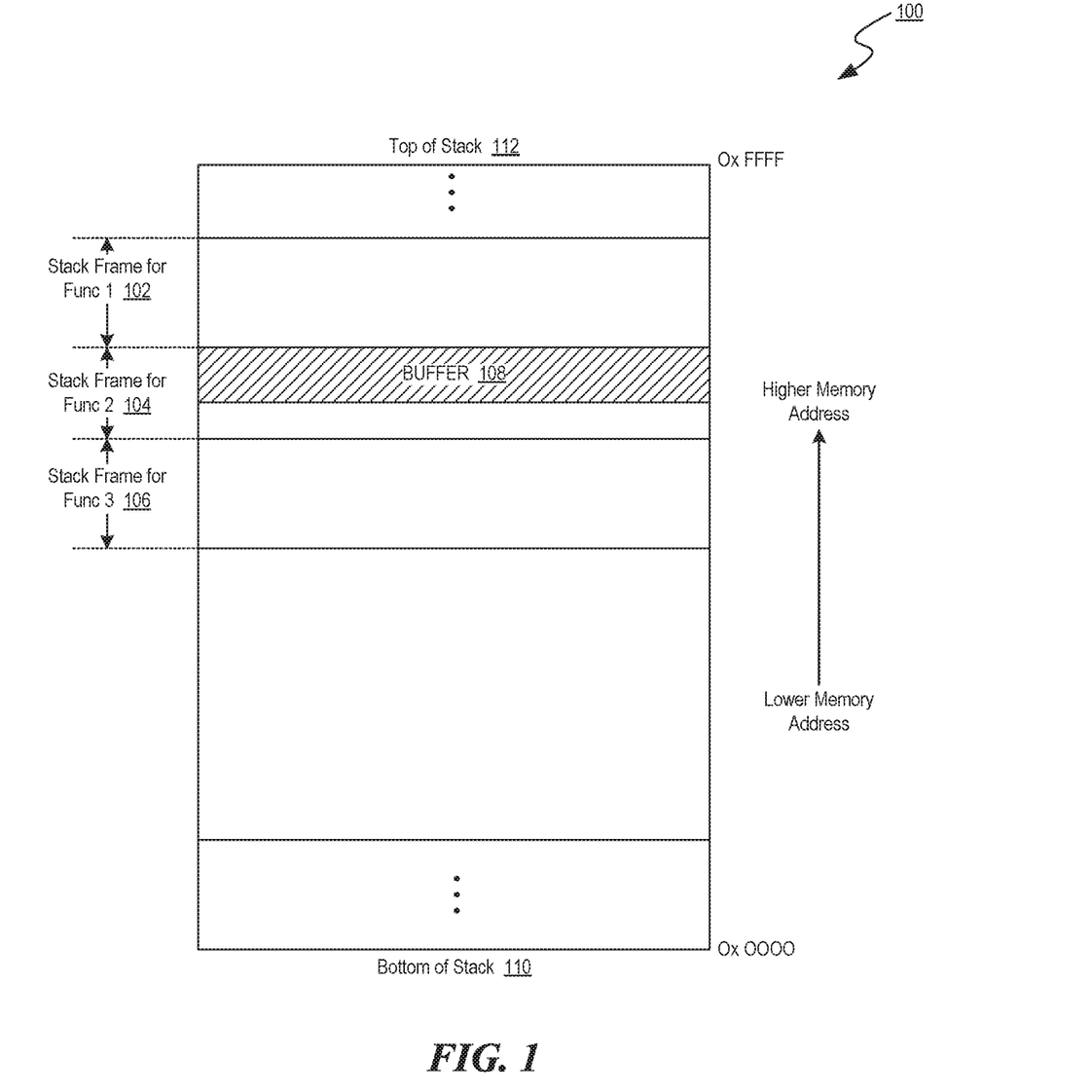
FIG. 1 shows a diagrammatic representation of a stack in computer memory.
Figure 2:
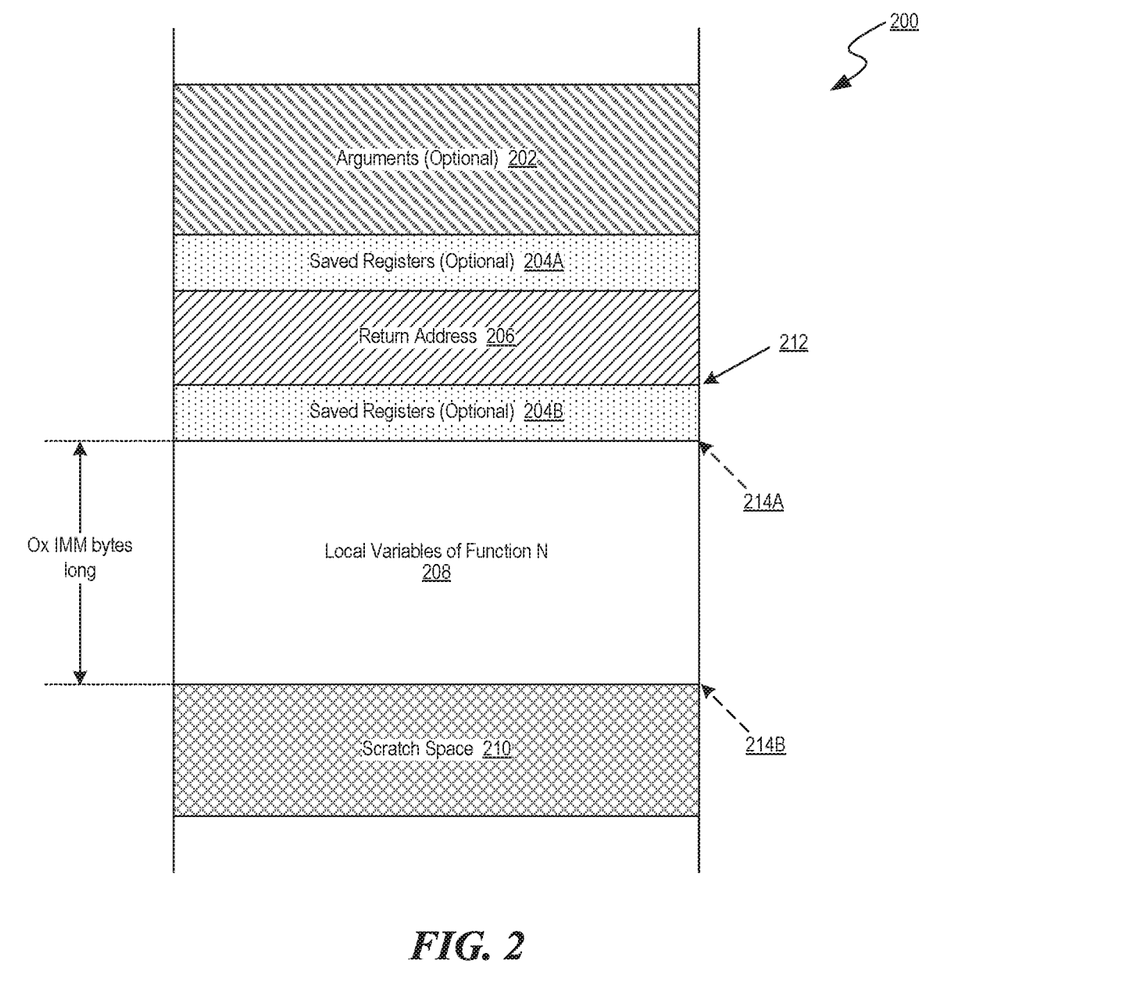
FIG. 2 shows a diagrammatic representation of a typical stack frame.

Referring now to the drawings, FIG. 1 shows a diagrammatic representation of a stack 100 in computer memory (alternately known as Random Access Memory or RAM). Stack 100 includes a top 112 and a bottom 110. When the program requires more memory, data/information is pushed at the bottom of the stack. Hence, as new data/information comes in, the newer data is "pushed below" the older ones. For example, stack 100 includes lower memory addresses (starting from 0x 0000) at the bottom 110, and higher memory addresses (ending at 0x FFFF) at the top 112. Stack 100 includes stack frames for three example functions, denoted Func 1, Func 2, and Func 3. The hypothetical example in FIG. 2 illustrates a scenario where Func 1 calls Func 2 and Func 2 calls Func 3. Local variables of Func 1, Func 2, and Func 3 are stored in their respective stack frames. In FIG. 1, the stack frames for Func 1, Func 2, Func 3 are denoted 102, 104, and 106 respectively.

On many systems, the memory layout of a program, or the system as a whole, is well defined. By sending in data designed to cause a buffer overflow, it is possible to write into areas known to hold executable code and replace it with malicious code, or to selectively overwrite data pertaining to the program's state, therefore causing behavior that was not intended by the original programmer. Buffers are widespread in operating system (OS) code, so it is possible to make attacks that perform privilege escalation and gain unlimited access to the computer's resources. FIG. 1 shows buffer 108 included within stack frame 104. Buffer overflows are one of the most common exploits in software that result from buggy code which fails to perform the appropriate bounds checking. A buffer overflow is an anomaly where a program, while writing data to a buffer (e.g., buffer 108), overruns the buffer's boundary and overwrites adjacent memory locations. For example, in FIG. 1, a buffer overflow can cause the program to overwrite a portion of stack 104.

In a hypothetical example of buffer overflow, a hypothetical bug identified as Bug A can cause a buffer overflow in a hypothetical program called Program B. During its operation, let us suppose that program B allocates a fixed-size piece of memory to hold a font name and then copies the font name from a file into this piece of memory. Program B does not, however, check to ensure whether the font name will entirely fit in this piece of memory. In an event when Program B is provided with a really long font name, Program B overflows the buffer, corrupting its own memory, and an attacker can use this to execute arbitrary malicious code.

Attackers can exploit buffer overflows to manipulate the normal flow of the program to their advantage in several ways. In one instance, an attacker can overwrite a local variable that is located near the overflowing buffer on the stack, in order to change the behavior of the program. In another instance, an attacker can overwrite the return address in a stack frame. As a result, when the function returns, execution will resume at the return address as specified by the attacker. The return address can be a buffer associated with a user input which can be manipulated by the attacker for malicious intent. In yet another instance, an attacker can overwrite a function pointer or an exception handler, which is subsequently executed. Under ideal circumstances, incorporation of bounds checking can prevent buffer overflows, but it consumes additional storage (e.g., extra lines of code) and requires additional computation time. As a result, bounds checking may not be applicable in many scenarios or use cases. An advantage of the disclosed technology is that does not require bounds checking and is thus well suited for such scenarios.

It will be understood that the stack in FIG. 1 is for illustrative purposes only. Embodiments of the present technology impose no restrictions on the lengths, the data/information stored in the stack, and/or the number of stack frames that can be allocated on the stack.

FIG. 2 shows a diagrammatic representation of a typical stack frame 200. Stack frame 200 includes memory allocated for: arguments 202; saved registers 204A, 204B; return address 206; local variables of an arbitrary Function N 208; and scratch space 210. The length of the stack frame is the amount (e.g., in number of bytes) of memory allocated to the local variables of Function N. This is denoted as the length 208 in FIG. 2.

Registers are data storage locations directly on the CPU. With some exceptions, the size, or width, of a CPU's registers define its architecture. For example, in a 64-bit CPU, registers are 64 bits wide. The same is true of 32-bit CPUs (32-bit registers), 16-bit CPUs, and so on. Registers are very fast to access and are often the operands for arithmetic and logic operations. In FIG. 2, data stored in registers can be saved optionally on the stack in regions 204A, 204B of the memory. A typical stack is an area of computer memory with a fixed origin and a variable size. Initially the size of the stack is zero. In FIG. 2, the length of the stack frame is denoted as 0xIMM bytes long.

A prologue or preamble of a function includes instructions (e.g., a few lines of code at the beginning of the function) for setting up a stack frame, i.e., for making space on the stack for local variables of the function. Thus, a function prologue typically performs the following actions: pushes the current base pointer onto the stack so it can be restored later; assigns the value of stack pointer (which is pointed to the saved base pointer) to the base pointer so that a new stack frame can be created on top of the old stack frame; and moves the stack pointer further by decreasing (or increasing) its value as the stack grows down (or up).

In the INTEL x86 processors, special registers are used to store the value of the stack pointer and frame pointer. For example, special registers rbp and rsp are used wherein rbp is the base pointer (also known as frame pointer), which points to the bottom of the current stack frame, and rsp is the stack pointer, which points to the top of the current stack frame. rbp has a higher value than rsp because the stack starts at a high memory address and grows downwards. On the INTEL x86 processors, a function prologue can include the sub rsp, 0xIMM instruction, where IMM denote how many bytes of space to allocate on the stack for storing local variables of a function. Thus, a hypothetical instruction sub rsp, 0x9 allocates 9 bytes of memory on the stack.

The stack pointer, usually in the form of a hardware register, points to the most recently referenced location on the stack. When the stack has a size of zero, the stack pointer points to the origin of the stack. In FIG. 2, the location of the stack pointer is denoted 214A at the start of the prologue and at location 214B at the end of the prologue. FIG. 2 also shows a frame pointer pointing to location 212 in the memory. At function return, the stack pointer is restored to the frame pointer, i.e., the value of the stack pointer just before the function was called.

An attacker that knows the stack frame size for a given function can use that information to craft reliable buffer overflow exploits in one or more functions having a buffer overflow vulnerability. The disclosed stack frame modification mitigates this by adding a randomly-generated value 0x N to the 0x IMM value used to create the stack frame. For example, given one instance of a program binary, the stack size of each function in the program binary can be subjected to the same random increase of N bytes. Consequently, the length of the stack frame for every function in a program increases by the same amount. Hence, when an attacker attempts to exploit the vulnerability, they are unable to successfully overwrite the return address, making their attack unsuccessful.

A function epilogue appears at the end of the function, and restores the stack and registers to the state they were at, before the function was called. In essence, the epilogue reverses the actions of the function prologue and returns control to the calling function. An epilogue typically does the following actions: drop the stack pointer to the current base pointer so room reserved in the prologue for local variables is freed; pops the base pointer off the stack so it is restored to its value before the prologue; and returns to the calling function by popping the previous frame's program counter off the stack and jumping to it.

When the function exits, the allocated memory (e.g., 9 bytes in the above example) is returned to the stack resulting in cleanup of the stack frame. On the INTEL x86 processors, a function epilogue can include the add rsp, 0xIMM instruction. For example, to return 9 bytes of memory, the instruction can be add rsp, 0x9. After exiting a function, the program returns control back to the memory address specified in the return address register (e.g., the address 206 in FIG. 2). In accordance with the disclosed technology, a function epilogue can include the add rsp, 0x (IMM+N) instruction for cleanup of the stack frame.

To understand the implementation of the improved CFI disclosed herein, it is first necessary to understand binary load process for a typical operating system, such as, for example the Microsoft's Windows operating system. Although, the binary load process is being described with respect to the Windows operating system, it would be understood by a person of order a skilled the art that this would apply to other operating systems as well.

Figure 3:
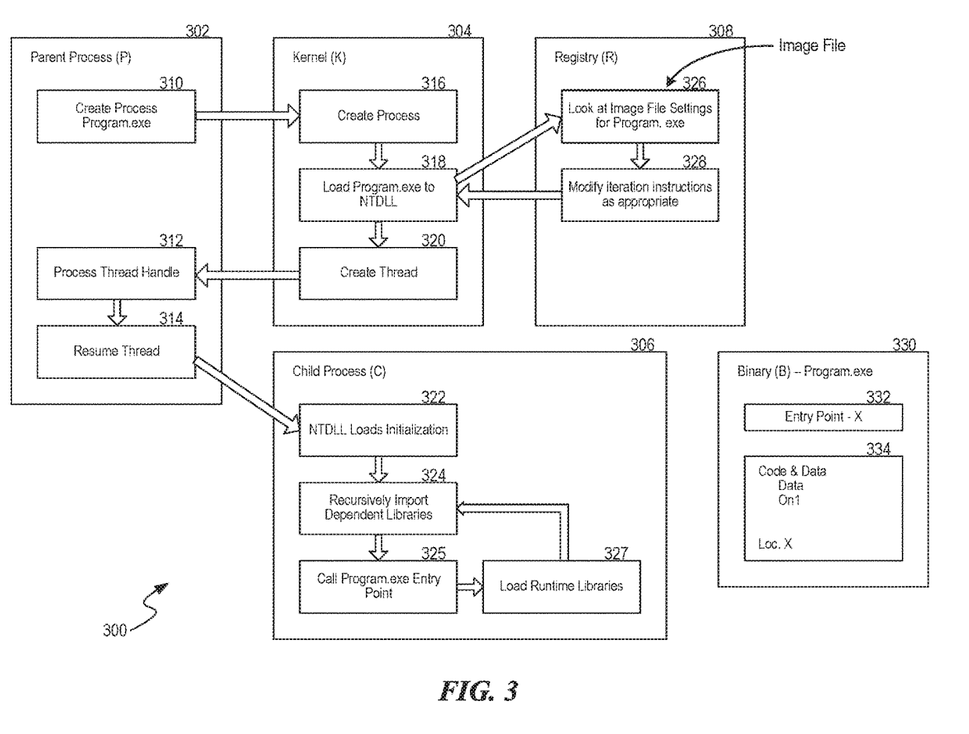
FIG. 3 shows a representative conventional binary load process for an operating system.

FIG. 3, generally at 300, shows a representative diagram for a normal binary load process. This process includes four components for establishing the running of a new program, e.g., in the Windows operating system. These components include parent process 302, kernel 304, child process 306, and registry 308. Parent process 302, which creates one or more child processes, requests the operating system to load a target program. The target program may be loaded from the command line, "cmd.exe." The target program also may be loaded from a graphical user interface ("GUI"), "explorer.exe."

Kernel 304 is the core of the operating system. The kernel manages all the hardware, I/O, displays, storage, and other systems of a computer. For purposes of the present technology, kernel 304 has the responsibility for allocating resources, e.g., memory, requested by the parent process and initializing the operating environment for each child process.

Child process 306, which is created by parent process 302, is a target program that is to be loaded and run. For purposes of the present technology, the child process 306 or the parent process 302 are protected by the improved CFI system and method of the present technology. With respect to the description of the present technology, a program run by the child process will be referred to as "Program.exe." Further, the term "Program.exe" for purposes of describing the present technology is meant to refer to any binary, e.g.,*.exe,*.com, and*.dll.

Preferably, registry 308 is a registry that has a file-based data-structure. The registry includes settings for the operating system and applications. For binaries on a computer, the registry includes settings that control the start-up instructions for any given binary.

Again referring to FIG. 3, the normal process for loading a binary, which in this case is a child program (Program.exe), on a computer will be described. The normal process being referred to is provided is only for the purposes of showing a system upon which the improved CFI system of the present technology may be layered. After there is an understanding of the normal binary loading process, the improved CFI system and method of the present technology that is layered on the normal binary loading process will be described.

Referring to FIG. 3 at 310, the current parent process (parent program) 302 packages a request to send to kernel 304 to launch child process (target program), Program.exe. At process step 316 of kernel 304, the kernel receives the request to create Program.exe. The kernel will perform implementation specific steps to verify that the request is allowed and the appropriate resources exist to create Program.exe. If the request is permitted, the kernel moves the request to process step 318. If the request not permitted, the request is denied and the process terminates.

Process step 318 queries appropriate information about the settings for Program.exe from registry 308. At process step 326 of registry 308, the image file settings of Program.exe are looked up based on the process name, in this case Program.exe. If the settings specify an alternative program to load, then the kernel load instructions are modified at process step 228. If the review reveals that there is no need for any modification to kernel load instructions, then information as to this condition is queued at process step 228 for transmission to process step 318 of kernel 304.

When the registry transmits instructions from process step 328 of registry 308 to process step 318 of kernel 304 and there is a need to modify the kernel instructions, the kernel load process will be adjusted accordingly. These registry instructions may include for example start-up flags or load a debugger. If, on the other hand, the transmission from process step 328 of registry 308 to process step 318 of kernel 304 includes no modification instructions, the kernel loading process will continue without modification.

Again referring to process step 318 of kernel 304, after the instructions have been received from process step 328 of registry 308 and implemented, the kernel copies Program.exe, Native code/data, and NTDLL from on disk locations into running memory. For purposes of describing the present technology, NTDLL includes a number of user-mode functions, such as call stubs and the runtime library code, collectively known as "Native API."

After processing at process step 318 of kernel 304 is completed, the process moves to process step 320 where a thread is created for the new process. With respect to the thread created at process step 320, it means the kernel resource, which corresponds to the execution state of the child process 306, will start executing at process step 322. The identifier of the process and the thread that is created is transmitted to step 312 of parent process 302 where these are stored in memory by the parent process. The process continues to process step 314 of parent process 302 where the thread from process step 320 is resumed, which means the kernel will schedule the thread to execute at some point in the future.

Process step 322 of the child process 306 begins once the kernel schedules the thread to execute, which cannot happen until the thread has been resumed at process step 314. At process step 322, there is NTDLL loader initialization. At this step, the child process specific initialization functions inside the NTDLL are executed and there is initialization of the data structures. For example, the functions that may be executed include the dynamic loader initializer and the data structures that may be initialized include the thread information block. Further, the process for loading dependent libraries begins.

Once the process activities at process step 322 are completed, the child process moves to process step 324 where dependent libraries are recursively imported to the child process. These libraries are received from the import tables stored in Program.exe and every loaded library. Following the import of dependent libraries, the child process is transmitted to process step 325. At process step 25, the Program.exe entry point is called. The entry point is a location that represents the beginning of the code for execution. In the Windows context, the file to be called would be in the PE file. The child process will begin to serially execute the instructions located at the entry point.

The binary to be executed is shown at 330 of FIG. 3. The entry point for the binary Program.exe is shown at 332. The native code and data for Program.exe are shown at 334 and it is located at "Loc. X" in an appropriate memory.

As shown at process step 325, there is a connection between it and load runtime libraries process step 327. At times during execution of the child program, additional libraries are referenced and loaded. This may be occur for several reasons, such as delayed imports or calls to functions, such as LoadLibrary. When that is the case, execution is paused at some "Instruction I" so the new library can be loaded from process step 327 to process step 325. The loading process is the same as before, and any dependent libraries are recursively loaded. Then, execution is transferred to the appropriate point in the library that has just been loaded, and when finished returns back to instruction I.

Figure 4:
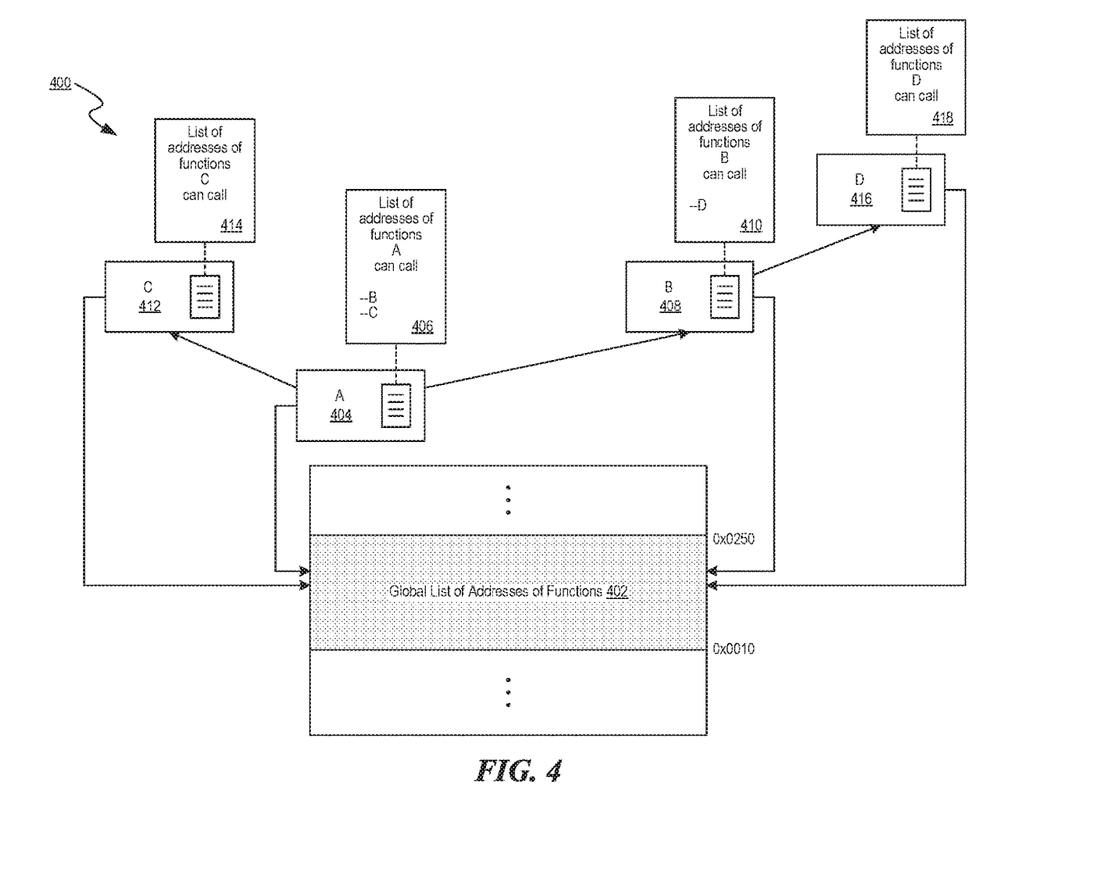
FIG. 4 shows a block diagram illustrating aspects of call checking CFI functionalities, according to some embodiments of the disclosed technology.

FIG. 4 shows a block diagram 400 illustrating aspects of call checking CFI, according to some embodiments of the disclosed technology. FIG. 4 describes an example scenario in which function A (denoted 404) calls function B (denoted 408) and function C (denoted 412), wherein functions, A, B, C, D are included in a program binary. Function A calls functions B and C. Function B calls function D. However, under normal operating conditions, function A doesn't call function D directly. FIG. 4 also demonstrates that each function in the program binary can access a global list of addresses of functions (denoted 402) in the memory. The global list (e.g., saved in stack memory between addresses 0x 0010 and 0x 0250) of addresses of functions includes addresses of entry points of functions or, in some implementations, code that resembles a function or otherwise having function-like characteristics. Examples of function-like characteristics can be code having debug symbols. In some implementations, a function can be identified using heuristics gleaned from the code and the data section.

In some embodiments, in addition to the global list of addresses, each function also has a local list of addresses that specifies one or more functions that the function can call. In FIG. 4, the lists are denoted 406, 410, 414, 418 which are local to functions A, B, C, D respectively. For example, local list 410 for function B includes function D. Local list 406 for function A includes functions B and C. The discussions in FIG. 4 are solely for illustrative purposes. In alternate embodiments, the disclosed call checking CFI can operate on other appropriate functions. For example, the disclosed call checking CFI can check the validity of calls to recursive functions (e.g., a function that calls itself). Furthermore, although the discussions in FIG. 5 are based on functions as being call targets, in alternate embodiments, other appropriate call targets (e.g., a register or a memory location) can be applicable.

Figure 5:
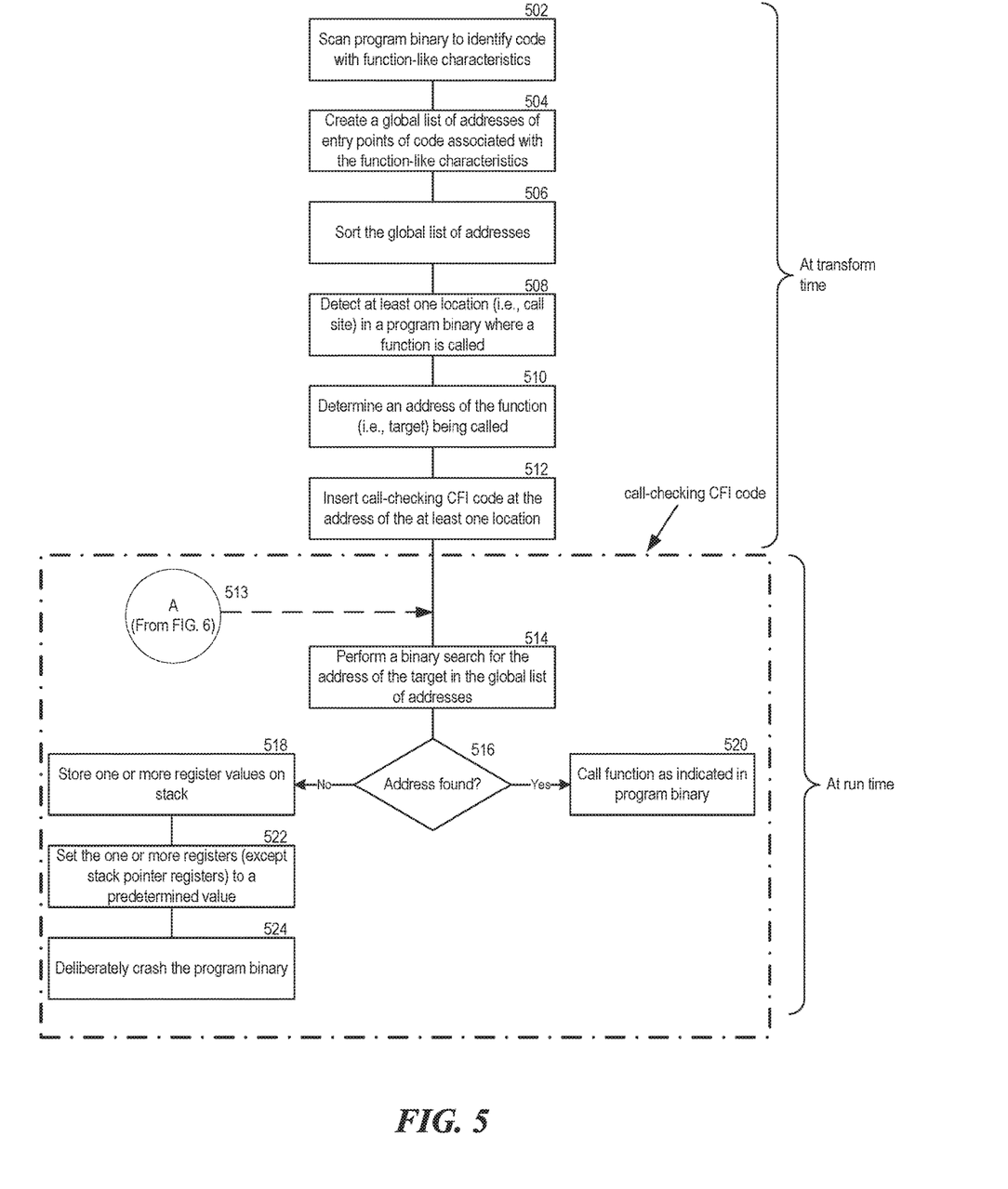
FIG. 5 shows a flowchart of steps associated with call checking CFI utilizing a global list of addresses of functions, according to some embodiments of the disclosed technology.

FIG. 5 shows a flowchart of steps of a process associated with call checking CFI utilizing a global list of addresses of functions, according to some embodiments of the disclosed technology. In some implementations, the disclosed call checking CFI protects indirect calls in which control/program flow is transferred to an address determined at runtime. In FIG. 5, steps 502 through 512 occur at transform time. Steps 514 through 524 occur at run time. At step 502, the process scans a program binary to identify code with function-like characteristics. For example, a function can be identified by the presence of debug symbols in one or more sections of the program binary. As another example, a function can be identified according to the information in the file headers. As yet another section, a function can be identified according to the heuristics of the code and data section. Another method for identifying functions is to search for sequences of bytes known to indicate function prologues. Identification of code resembling function-like characteristics can be done using an automated tool (e.g., Binary Ninja, IDA Pro, or Immunity Debugger) and/or manually by a programmer. At step 504, the process creates a global list (e.g., list 402 in FIG. 4) of addresses (e.g., memory locations) of entry points of code having function-like characteristics. In some implementations, the process first creates a model of the program binary and then executes steps 502, 504. The model can be used to identify a block of executable byte as code or data. In some implementations, the global list created at step 504 is supplemented with address locations that do not necessarily have function-like characteristics. For example, the address locations can be associated with code or data. Thus, if a sequence of bytes is not identifiable as code or data, in some implementations, each byte of unidentifiable code can be "considered" to be the entry point of a function, even though in reality that may not be the case. As a result, this approach can result in an overestimated global list. One advantage of an overestimated global list is that it results in a transformed binary with higher reliability and robustness, even under normal operating conditions, i.e., without a cyberattack when the program binary is operating as intended. The process saves and sorts (step 506) the global list of addresses. At step 508, the process detects at least one location (alternatively referred to herein as a call site) in a program binary where a function is called. At step 510, the process determines an address of the target being called. At step 512, the process hijacks normal program flow by injecting or inserting call checking CFI code at the call site. In FIG. 5, steps 513, 514, 516, 518, 520, 522, and 524 are included as part of the call checking CFI code inserted in step 512. (Step 513 is optional (denoted with a dashed line) and based on the embodiment discussed in connection with FIG. 6.)

At step 514, the process performs a search (e.g., using binary search methodology) for the address of the target in the global list of addresses. If the process determines (at step 516) that the address of the target is included in the global list of addresses, then at step 520 the function is called (e.g., normal program flow) as indicated in the program binary. If, on the other hand, the process determines (step 516) that the address of the target is not included in the global list of addresses, then the process moves to step 518 in which it stores one or more register values (with the exception of the stack pointer register) on the stack. The stack pointer register is not saved because it will not be overwritten in step 522, allowing it to be used by an expert/programmer to analyze a cyber attack. At step 522, the process sets the one or more register values to a predetermined value and deliberately crashes (step 524) the program binary. Although the discussions in FIG. 5 are based on functions as being call targets, in alternate embodiments, other appropriate call targets (e.g., a register or a memory location) can be applicable. The process starts at step 514 every time a function is called.

Figure 6:
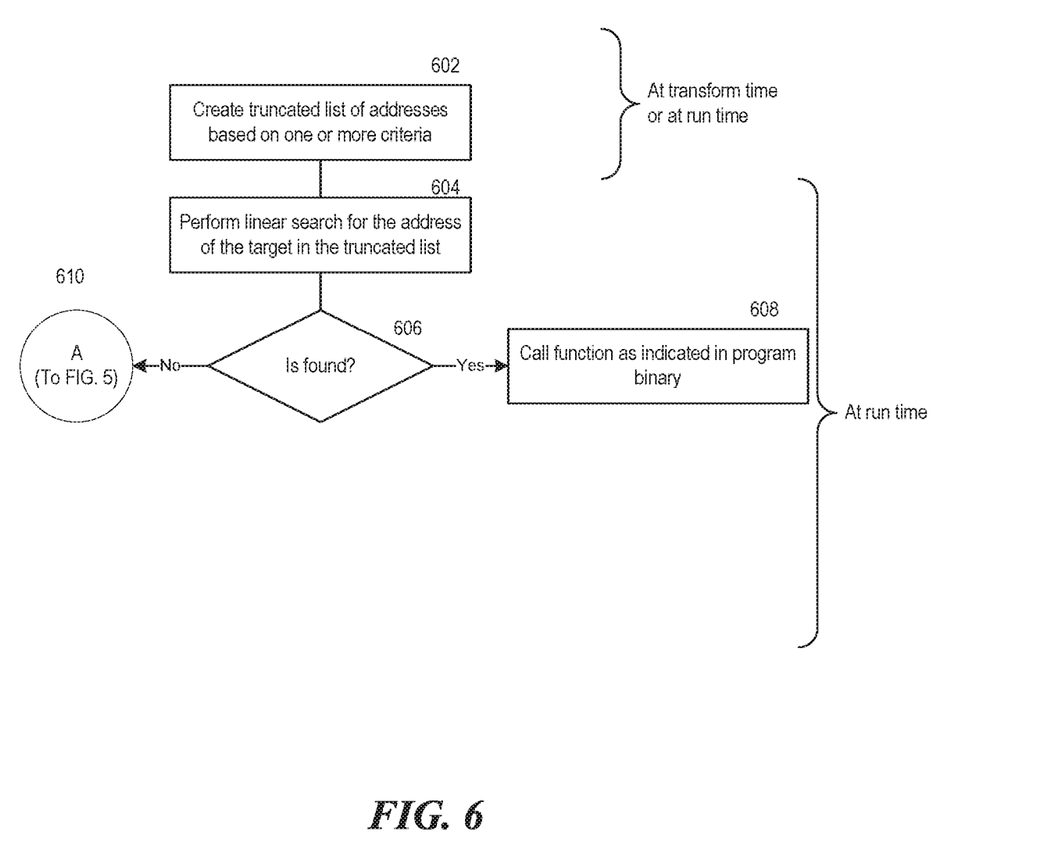
FIG. 6 shows a flowchart of steps associated with call checking CFI utilizing a truncated list of addresses of functions, according to some embodiments of the disclosed technology.

FIG. 6 shows a flowchart of steps of a process associated with call checking CFI utilizing a truncated list (e.g., any of lists 406, 410, 414, 418 in FIG. 4) of addresses of functions, according to some embodiments of the disclosed technology. The process described in FIG. 6 is optional to the baseline process described in FIG. 5. That is, the process in FIG. 6 utilizes a truncated list of addresses that is additional to the global list of addresses described in FIG. 5. Step 602 of the process occurs at transform time or run time. Steps 604, 606, 608, 610 of the process are performed at run time. The process starts at step 604 every time a function is called.

At step 602, the process creates a truncated list (e.g., stored local to a function) of addresses based on one or more criteria. For example, the criteria can be a list of recently-called functions. As another example, the criteria can be a list of functions that are more likely to be called from a given call site in the program binary. As yet another location, the criteria can be a list of functions that are spatially proximate to the call site. At step 604, the process performs a search (e.g., using linear search methodology) for the address of the target in the truncated list of addresses. At step 606, the process determines if the address of the target is included in the truncated list of addresses. If the process determines that the address of the target is included in the truncated list of addresses, then at step 608 the function is called (e.g., normal program flow) as indicated in the program binary. If the process determines that the address of the target is not included in the truncated list of addresses, then at step 610, the process enters step 513 in FIG. 5. As a result, the process then follows the steps as described in FIG. 5. Although the discussions in FIG. 6 are based on functions as being call targets, in alternate embodiments, other appropriate call targets (e.g., a register or a memory location) can be applicable.

The embodiment in FIG. 6 represents an optimized approach to call checking CFI. One criteria that may be used in the optimization is the location of a called function with respect to a calling function. That is, functions located close to the calling function in memory are likely to be called more. Another criteria that may be used in the optimization are recently called functions. Yet another criteria that may be used in the optimization may be the often called functions in a program binary. Any or a combination of the above criteria can be determined through static or dynamic analyses.

Figure 7A:
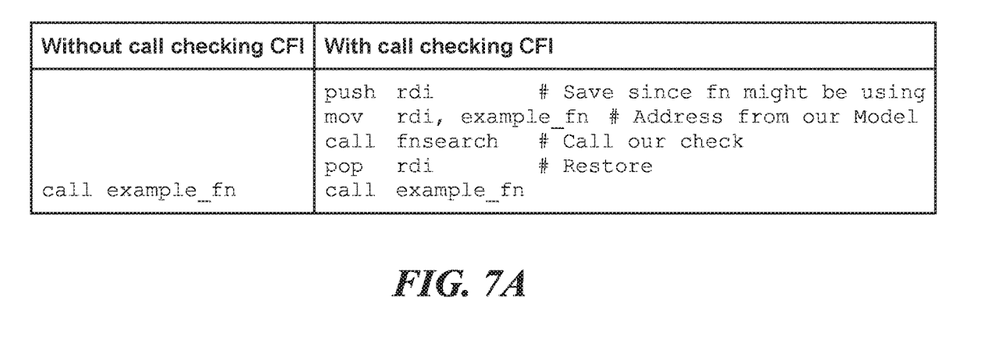
FIGS. 7A, 7B, and 7C illustrate representative samples of call checking CFI code in connection with different types of calls, according to some embodiments of the disclosed technology.
Figure 7B:
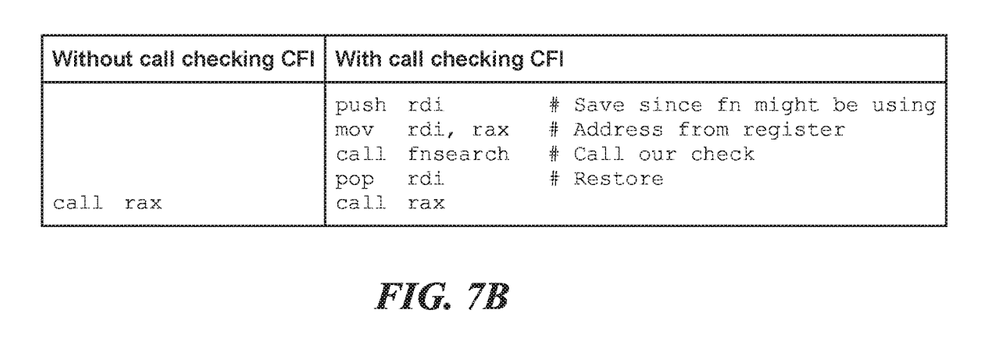
Figure 7C:
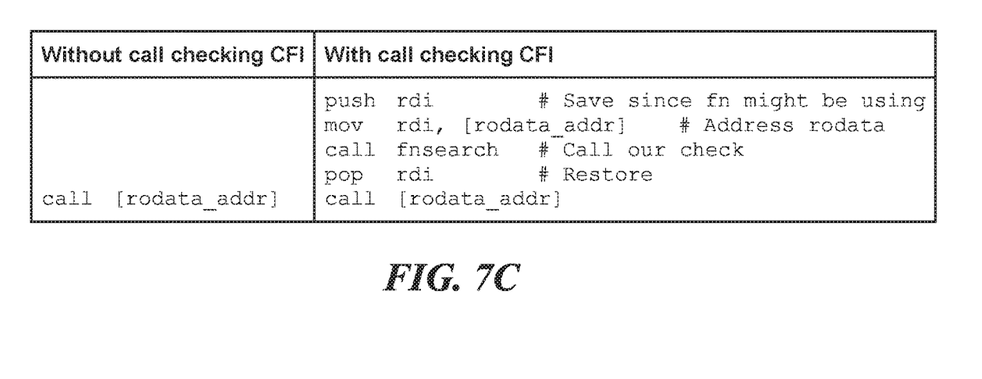

FIGS. 7A, 7B, and 7C illustrate representative sample of call checking CFI code in connection with different types of calls, according to some embodiments of the disclosed technology. Specifically, FIG. 7A is associated with absolute/relative calls of a function, FIG. 7B is associated with register calls, and FIG. 7C is associated with memory calls.

In FIG. 7A, the emitted assembly indicates that before the function example_fn is called, the call checking CFI code (e.g., first four lines of assembly in the right hand column) is inserted in which with the value of rdi register is passed to the list checking function fnseacrch.

In FIG. 7B, the emitted assembly indicates that before register rax is called, the call checking CFI code (e.g., first four lines of assembly in the right hand column) is inserted in which with the value of rdi register is passed to the list checking function fnseacrch.

In FIG. 7C, the emitted assembly indicates that before memory location [rodata_addr] is called, the call checking CFI code (e.g., first four lines of assembly in the right hand column) is inserted in which with the value of rdi register is passed to the list checking function fnseacrch.

The examples in FIGS. 7A, 7B, and 7C use the rdi register on INTEL x86 processors merely for illustration and discussion. In alternate embodiments, other suitable registers of the INTEL x86 processors and/or other processors can be used. Also, other appropriate call targets, besides those discussed in FIGS. 7A, 7B, and 7C can be applicable targets for call checking CFI.

The systems and methods of the present disclosure includes the ability to hijack program flow by insert call checking CFI code before calling a target. Examples of a target can be a function within the program binary, a register, or a memory location. If the call target is a valid call target (e.g., included in a global list of addresses), normal program flow resumes and the program flow is transferred to the target. On the contrary, if the call target is not a valid call target (e.g., not included in a global list of addresses), the program binary is deliberately crashed. The injected call checking code improves the robustness of the program binary against cyberattacks and results in an improved CFI. Yet, the improved CFI consumes less average overhead and does not require all of the complications of the conventional CFI systems.

Some of the disclosed embodiments are presented below in clause-based format.

1. A method of hijacking program flow for defending against stack-based cybersecurity attacks that exploit vulnerabilities in buffer overflows of a stack register included as part of a random access memory (RAM) configured for storing local variables of a function of a program binary comprising:

scanning the program binary to identify code resembling function-like characteristics;

creating a global list of addresses of entry points of code associated with the function-like characteristics;

sorting the global list of addresses;

detecting, in the program binary, at least one call site where a target is called;

determining an address of the target; and inserting call checking code at the at least one call site.

2. The method of clause 1, wherein inserting the call checking code includes:

searching for an address of the at least one call site in the global list of addresses; and upon determining that the address of the target is included in the global list of addresses, calling the target.

3. The method of clause 1, wherein inserting the call checking code includes:
searching for an address of the target in the global list of addresses; and
upon determining that the address of the target is not included in the global list of addresses:
storing one or more register values on the stack register;
setting the one or more register values to a predetermined value; and
deliberately crashing the program binary.

4. The method of clause 1, wherein the one or more register values excludes a value of the stack pointer register.

5. The method of clause 1, wherein the program binary is standalone code devoid of the source code.

6. The method of clause 1, wherein the searching is based on a binary search methodology.

7. The method of clause 1, wherein scanning the program binary includes classifying portions of the program binary as one or more executable code blocks or one or more data blocks.

8. The method of clause 6, further comprising:
supplementing the global list of addresses with addresses of additional code blocks that failed to be classified as the one or more executable code blocks or as the one or more data blocks.

9. The method of clause 1, wherein the target is a function, a register, or a memory location in the program binary.

10. The method of clause 1, further comprising:
creating a truncated list of addresses of entry points of code associated with the function-like characteristics, based on assessing one or more criteria;
sorting the truncated list of addresses;
searching for the address of the target in the truncated list of addresses;
and
upon determining that the address of the target is included in the truncated list of addresses, calling the target.

11. A non-transitory computer-readable storage medium having stored thereon instructions for hijacking program flow in defending against stack-based cybersecurity attacks that exploit vulnerabilities in buffer overflows of a stack register included as part of a random access memory (RAM) configured for storing local variables of a function included in the program binary, wherein the instructions when executed by a processor of an electronic device cause the processor to:
scan the program binary to identify code resembling function-like characteristics;
create a global list of addresses of entry points of code associated with the function-like characteristics;
sort the global list of addresses;
detect, in the program binary, at least one call site where a target is called;
determine an address of the target; and
insert call checking code at the at least one call site.

12. The non-transitory computer-readable storage medium of clause 11, wherein inserting the call checking code includes:
searching for the address of the at least one call site in the global list of addresses; and
upon determining that the address of the target is included in the global list of addresses, calling the target.

13. The non-transitory computer-readable storage medium of clause 11, wherein inserting the call checking code includes:
searching for the address of the target in the global list of addresses; and
upon determining that the address of the target is not included in the global list of addresses:
storing one or more register values on the stack register;
setting the one or more register values to a predetermined value; and
deliberately crashing the program binary.

14. The non-transitory computer-readable storage medium of clause 11, wherein the one or more register values excludes a value of the stack pointer register.

15. The non-transitory computer-readable storage medium of clause 11, wherein the program binary is standalone code devoid of the source code.

16. An apparatus for hijacking program flow in a program binary for defending against stack-based cybersecurity attacks that exploit vulnerabilities in buffer overflows comprising:
at least one random access memory (RAM) storing a stack register configured for storing local variables of a function included in a program binary; and
at least one processor coupled to the at least one RAM, the at least one processor configured for:
scanning the program binary to identify code resembling function-like characteristics;
creating a global list of addresses of entry points of code associated with the function-like characteristics;
sorting the global list of addresses;
detecting, in the program binary, at least one call site where a target is called;
determining an address of the target; and
inserting call checking code at the at least one call site.

17. The apparatus of clause 16, wherein inserting the call checking code includes:
searching for the address of the at least one call site in the global list of addresses; and
upon determining that the address of the target is included in the global list of addresses, calling the target.

18. The apparatus of clause 16, wherein inserting the call checking code includes:
searching for the address of the target in the global list of addresses; and
upon determining that the address of the target is not included in the global list of addresses:
storing one or more register values on the stack register;
setting the one or more register values to a predetermined value; and
deliberately crashing the program binary.

19. The apparatus of clause 16, wherein the one or more register values excludes a value of the stack pointer register.

20. The apparatus of clause 16, wherein the program binary is standalone code devoid of the source code.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present disclosure is not intended to be limited to the embodiments shown or described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of hijacking program flow for defending against stack-based cybersecurity attacks that exploit vulnerabilities in buffer overflows of a stack register included as part of a random access memory (RAM) configured for storing local variables of a function of a program binary comprising:
   transforming the program binary into a transformed program binary by performing the following:
      scanning, at transform time, the program binary to identify code resembling function-like characteristics;
      creating, at the transform time, a global list of addresses of entry points of code associated with the function-like characteristics;
      sorting, at the transform time, the global list of addresses;
      detecting, in the program binary at the transform time, at least one call site where a target is called;
      determining, at the transform time, an address of the target; and
      inserting, at the transform time, call checking code at the at least one call site wherein the transform time is prior to loading and running the transformed program binary.

2. The method of claim 1, wherein executing the call checking code includes:
   searching for the address of the target in the global list of addresses; and
   upon determining that the address of the target is included in the global list of addresses, calling the target.

3. The method of claim 1, wherein executing the call checking code includes:
   searching for the address of the target in the global list of addresses; and
   upon determining that the address of the target is not included in the global list of addresses:
   storing one or more register values on the stack register;
   setting the one or more register values to a predetermined value; and
   deliberately crashing the transformed program binary.

4. The method of claim 3, wherein the one or more register values excludes a value of the stack pointer register.

5. The method of claim 1, wherein the program binary is standalone code devoid of the source code.

6. The method of claim 2, wherein the searching is based on a binary search methodology.

7. The method of claim 1, wherein scanning the program binary includes classifying portions of the program binary as one or more executable code blocks or one or more data blocks.

8. The method of claim 7, further comprising:
   supplementing the global list of addresses with addresses of additional code blocks that failed to be classified as the one or more executable code blocks or as the one or more data blocks.

9. The method of claim 1, wherein the target is a function, a register, or a memory location in the program binary.

10. The method of claim 1, further comprising:
    creating a truncated list of addresses of entry points of code associated with the function- like characteristics, based on assessing one or more criteria;
    sorting the truncated list of addresses;
    searching for the address of the target in the truncated list of addresses; and
    upon determining that the address of the target is included in the truncated list of addresses, calling the target.

11. A non-transitory computer-readable storage medium having stored thereon instructions for hijacking program flow in defending against stack-based cybersecurity attacks that exploit vulnerabilities in buffer overflows of a stack register included as part of a random access memory (RAM) configured for storing local variables of a function included in a program binary, wherein the instructions when executed by a processor of an electronic device cause the processor to:
   transform the program binary into a transformed program binary by causing the processor to:
      scan, at transform time, the program binary to identify code resembling function- like characteristics;
      create, at transform time, a global list of addresses of entry points of code associated with the function-like characteristics;

sort, at transform time, the global list of addresses;

detect, in the program binary at transform time, at least one call site where a target is called;

determine, at transform time, an address of the target; and insert, at transform time, call checking code at the at least one call site wherein the transform time is prior to loading and running the transformed program binary.

12. The non-transitory computer-readable storage medium of claim 11, wherein executing the call checking code includes:

searching for the address of the target in the global list of addresses; and upon determining that the address of the target is included in the global list of addresses, calling the target.

13. The non-transitory computer-readable storage medium of claim 11, wherein executing the call checking code includes:

searching for the address of the target in the global list of addresses; and upon determining that the address of the target is not included in the global list of addresses:

storing one or more register values on the stack register;

setting the one or more register values to a predetermined value; and deliberately crashing the program binary.

14. The non-transitory computer-readable storage medium of claim 13, wherein the one or more register values excludes a value of the stack pointer register.

15. The non-transitory computer-readable storage medium of claim 11, wherein the program binary is standalone code devoid of the source code.

16. An apparatus for hijacking program flow in a program binary for defending against stack-based cybersecurity attacks that exploit vulnerabilities in buffer overflows comprising:

at least one random access memory (RAM) storing a stack register configured for storing local variables of a function included in a program binary; and at least one processor coupled to the at least one RAM, the at least one processor configured for:

transforming the program binary into a transformed program binary by performing the following:

scanning, at transform time, the program binary to identify code resembling function-like characteristics;

creating, at transform time, a global list of addresses of entry points of code associated with the function-like characteristics;

sorting, at transform time, the global list of addresses;

detecting, in the program binary at transform time, at least one call site where a target is called;

determining, at transform time, an address of the target; and inserting, at transform time, call checking code at the at least one call site, wherein the transform time is prior to loading and running the transformed program binary.

17. The apparatus of claim 16, wherein executing the call checking code includes:

searching for the address of the target in the global list of addresses; and upon determining that the address of the target is included in the global list of addresses, calling the target.

18. The apparatus of claim 16, wherein executing the call checking code includes:

searching for the address of the target in the global list of addresses; and upon determining that the address of the target is not included in the global list of addresses:

storing one or more register values on the stack register;

setting the one or more register values to a predetermined value; and deliberately crashing the program binary.

19. The apparatus of claim 18, wherein the one or more register values excludes a value of the stack pointer register.

20. The apparatus of claim 16, wherein the program binary is standalone code devoid of the source code.

* * * * *